June 13, 1961 A. CHAUSSON 2,988,376
DEVICE FOR REGULATING THE HEIGHT OF THE BODY
OF A VEHICLE IN RELATION TO THE GROUND
Filed May 19, 1958 5 Sheets-Sheet 1
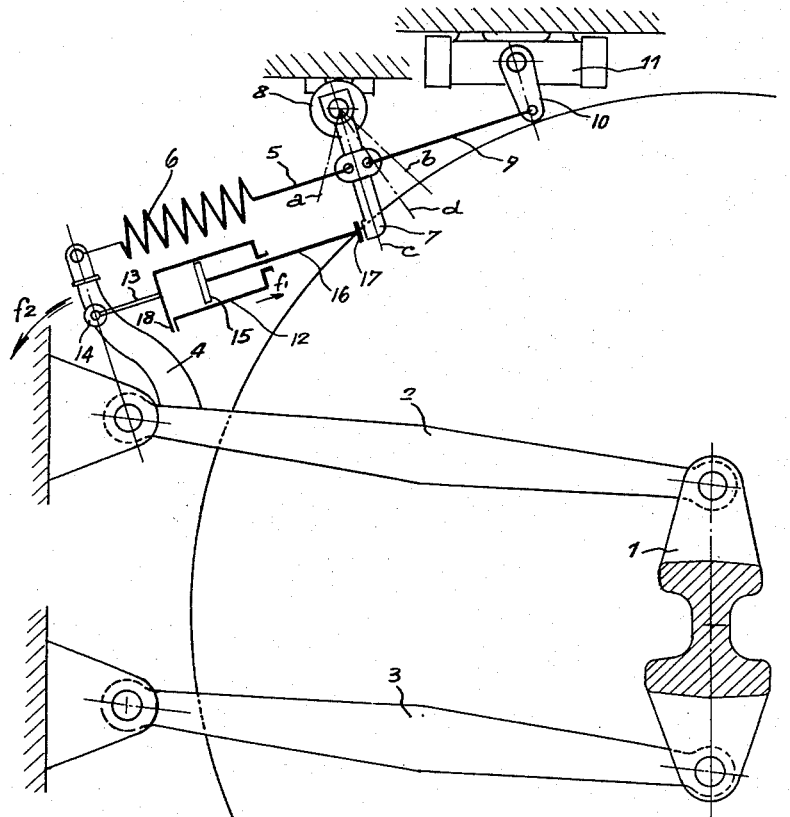
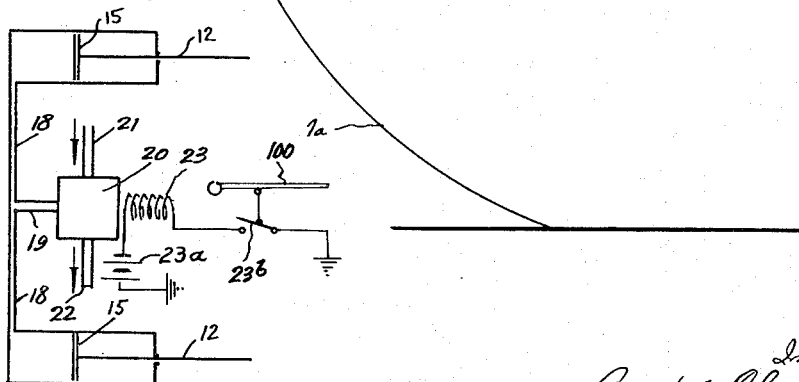
Inventor
André Chausson
By Alvin Browdy
Attorney

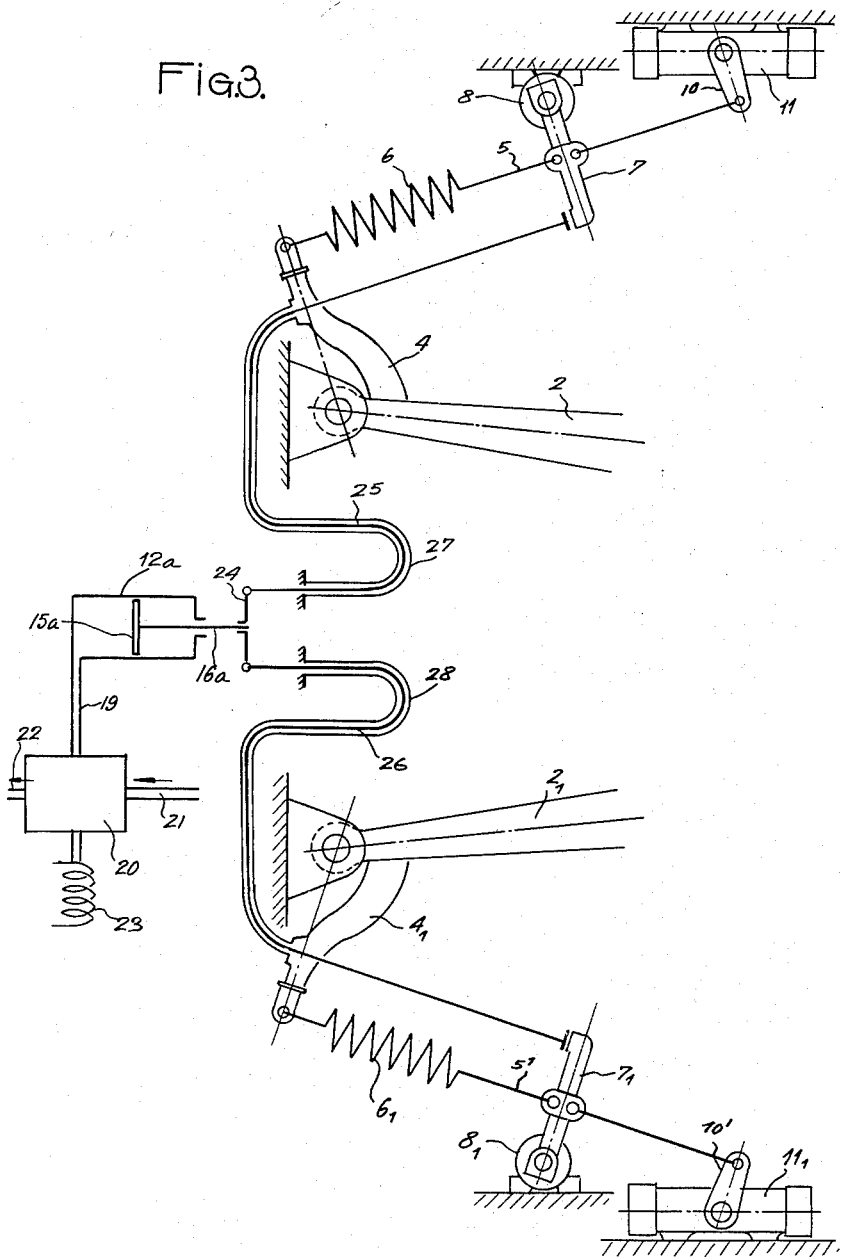

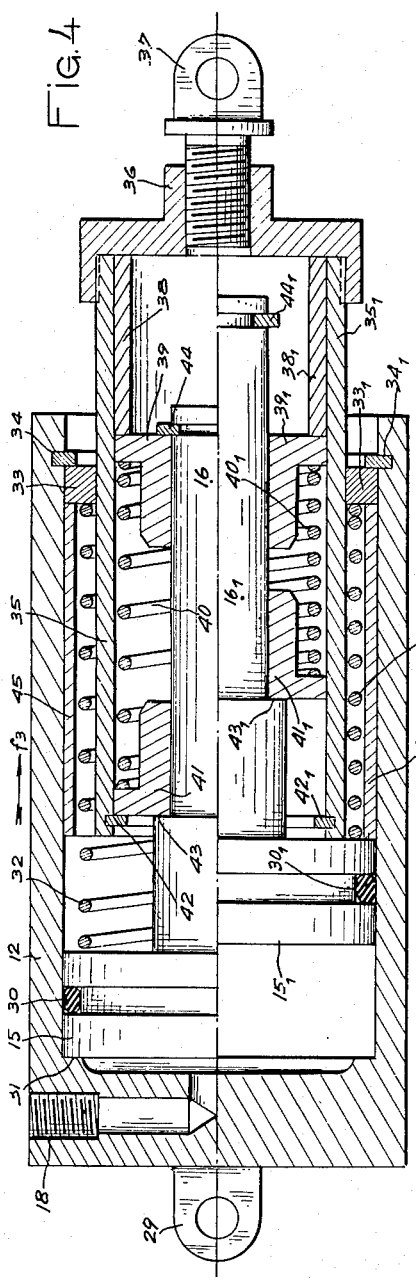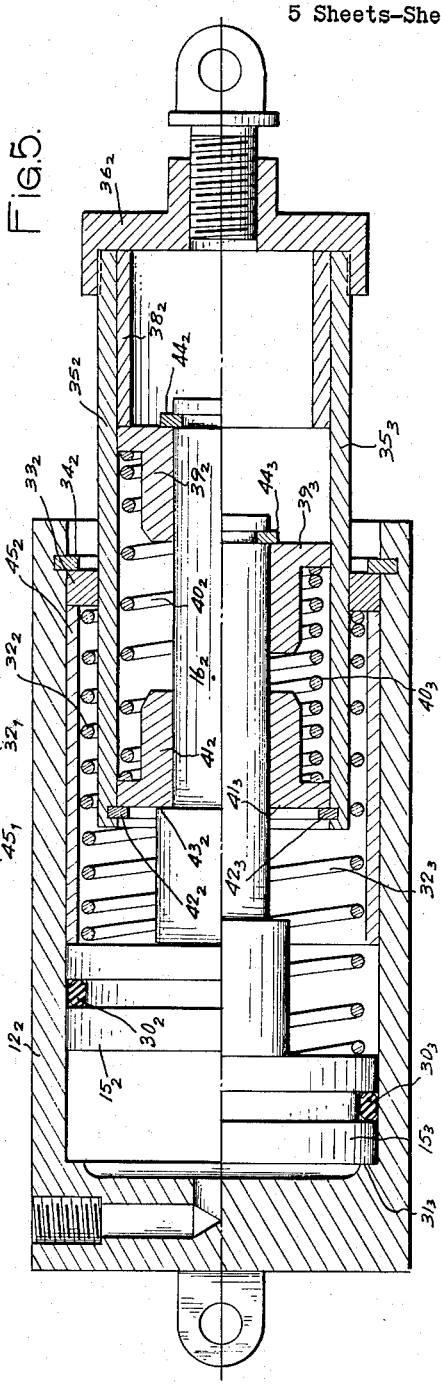

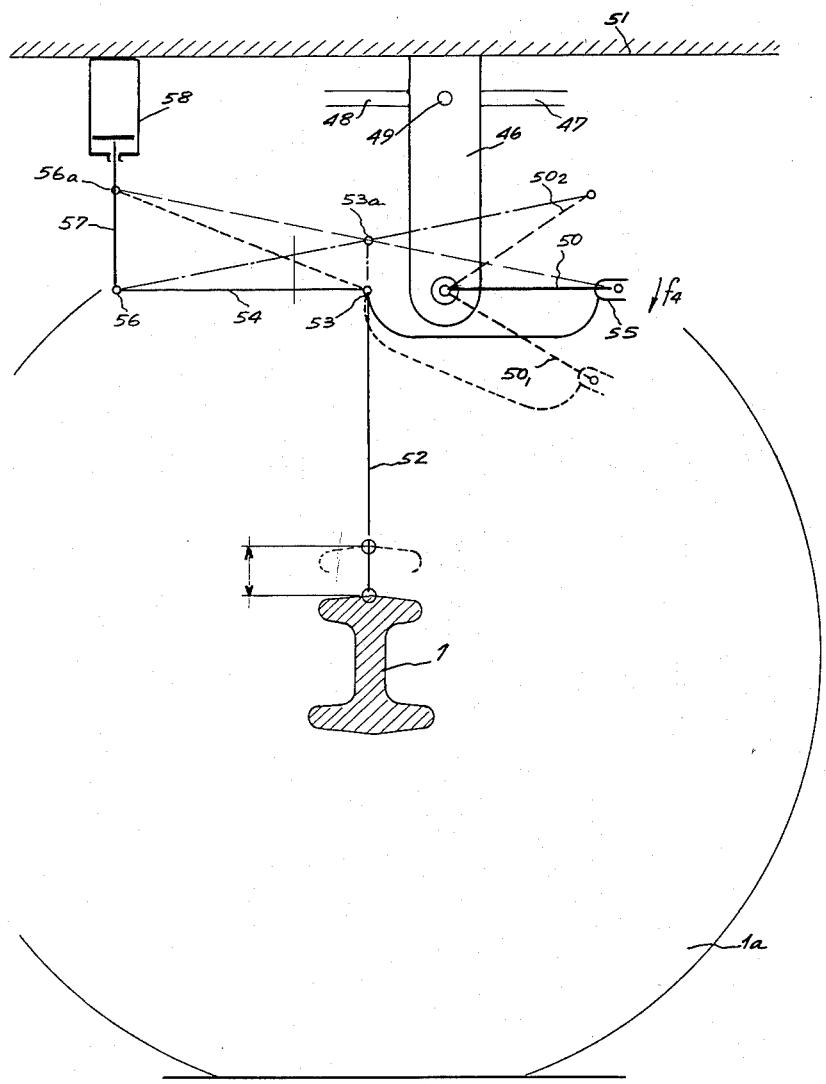

United States Patent Office 2,988,376
Patented June 13, 1961

2,988,376
DEVICE FOR REGULATING THE HEIGHT OF THE BODY OF A VEHICLE IN RELATION TO THE GROUND
André Chausson, Asnieres, France, assignor to Societe Anonyme des Usines Chausson, Asnieres, France, a company of France
Filed May 19, 1958, Ser. No. 736,169
Claims priority, application France May 20, 1957
2 Claims. (Cl. 280—124)

In constructing road vehicles and especially heavy vehicles such as passenger motor-buses, it is necessary that the chassis or body of these vehicles be sufficiently far from the ground so as to afford proper clearance for the spring system of the suspension. This imperative necessity and the existence of numerous mechanical members underneath the chassis means that the floor must be relatively high, which is a hindrance for passengers when entering or alighting from the vehicle. Moreover, the time taken by passengers for getting in and out, owing to the necessary existence of several steps at the entrance, considerably increases stoppage times and hence reduces the working profits.

The present invention obviates these disadvantages by creating a new device which, when the vehicle is stopped, enables the floor to be brought nearer to the ground, and hence, makes access easier.

According to the invention, the device for regulating the height of the body of a vehicle when stopped in relation to the ground, is characterized in that it comprises a member sensitive to the position of the sprung part of the vehicle in relation to its non-sprung part, this member ensuring the regulating of a suspension device for restoring between the sprung and non-sprung parts, a mean reference position during the oscillations of one of the two parts, this member being also associated with an element which is itself controlled from some point or other of the vehicle, a door, for example, so as to bring it into a position for which it modifies the reference position, so as to vary the height of the spring part in relation to the non-sprung part, when the vehicle is stopped.

Numerous other characteristics of the invention will be revealed by the detailed description which follows and forms of embodiment of the purpose of the invention are shown, by way of non-restrictive examples, in the attached drawings.

FIG. 1 is a diagrammatic elevation showing one form of embodiment of the device according to the invention.

FIG. 2 is a diagram of an embodiment detail of the device according to FIG. 1.

FIG. 3 is a diagrammatic view showing a slight modification of the device according to FIG. 1.

FIGS. 4 and 5 are half-section elevations of a form of embodiment of certain members shown diagrammatically in FIGURES 1 and 3, these members being shown in characteristic positions corresponding to various working phases.

FIG. 6 is a diagram of an alternative embodiment of the device according to FIGURES 1 and 3.

Figure 1A:
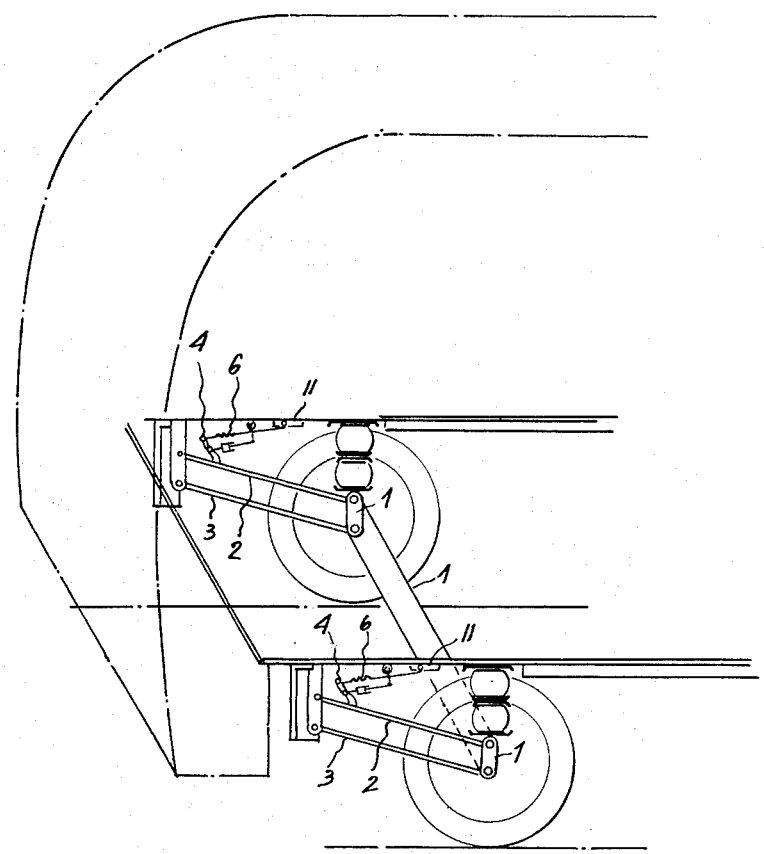
FIG. 1a is a diagrammatic perspective view showing opposite wheels of a vehicle provided with the suspension device.

According to the drawing, and in particular, FIG. 1, 1 designates one of the axle-carriers of a wheel 1a of a vehicle, this axle-carrier being connected to the chassis or body by connecting-rods 2, 3. The connecting rod 2 is integral with a lever 4. The end of the latter is connected, by a small connecting-rod 5 comprising a resilient member 6, to the crank 7 of a distributor 8 intended to control the conveyance of liquid under pressure to a spring device (not shown) with hydraulic control, of the kind currently employed in what are known as hydraulic suspensions.

The crank 7 is, furthermore, connected by a rigid connecting-rod 9 to the driving member 10 of a double-acting shock-absorber 11, hereinafter called a dash-pot.

12 designates a cylinder connected to the lever 4 by a rod 13 hinged at 14. The cylinder 12, which forms the body of a single-acting jack, comprises a piston 15 whose rod 16 is provided with an abutment member 17 intended to activate the crank 7 of the distributor 8, by making it pivot. The piston 15 can only drive the crank 7 in the direction for which the rod 16 thrusts this crank.

The assembly of the members described above is mounted in a symmetrical manner on the two wheels of the same set of wheels of the vehicle and the two supply conduits 18 of the two cylinders 12 of this set are connected together, as shown in FIG. 2, so that these cylinders are simultaneously supplied through the output conduit 19 of an electro-valve 20 connected by a tube 21 to a liquid source under pressure and by a tube 22 to a liquid storage tank or reservoir.

23 designates the winding of the eletcro-valve 20. The winding 23 is fed from a suitable current source, such as the batteries 23a of the vehicle, this feed being controlled by a control switch 23b according to the position occupied by certain of the members of the vehicle such as a door 100 connected to said switch 23b.

By way of example, the feed of the winding 23 can be controlled by closing and opening the doors of this vehicle or possibly by the rotation speed of the engine or any other member. It is also possible for this feed to be simultaneously controlled by several of these members.

The crank 7 of the distributor 8 can occupy all the positions comprised between the axis referred to by the letter $a$ and the axis referred to by the letter $b$. In the position shown in the drawing, being $c$, the distributor is in the neutral position, i.e., the suspension device is not fed, which corresponds to the normal reference position of the body of the vehicle when the latter is moving.

The short-period oscillations of the wheel 1a are absorbed by the spring 6 of the small connecting-rod 5, since the dash-pot 11 acts as a brake for the crank 7; consequently, only clearances which exceed a duration beyond a certain limit are able to influence the distributor 8 which feeds the spring device in a suitable manner for bringing the connecting-rods 2 into a proper position so that the crank 7 is once more in the position $c$.

When the vehicle is stopped, for example, and presuming that the winding 23 is operated by opening the doors of this vehicle, the electro-valve 20 is brought into a position where the conduit 22 is closed and the conduit 19 put into communication with the conduit 21 for conveying the fluid under pressure. This has the effect of feeding the cylinders 12, whose pistons are thrust in the direction of the arrow $f_1$, so that the crank 7 occupies the position $d$. In this position, the distributor 8 feeds the suspension device in the direction for which the body of the vehicle descends. The descending movement of the body has the effect of causing the lever 4 to pivot in the direction of the arrow $f_2$ until the moment when the crank 7 is brought to the position $c$, which corresponds to a given lowering of the body of the vehicle.

By carrying out the opposite movement to the one mentioned above, i.e., by closing the doors of the vehicle or operating the other governing members, the winding 23 is, for example, again fed, so that the electro-valve puts the tubes 19 and 22 into communication, which has the effect of causing the cylinders 12 to communicate with the tank or reservoir of fluid, and consequently, the pistons 15 are released.

The spring 6 of the connecting-rod 5, which had been stretched during the descending movement of the body of the vehicle, exerts a pull on the crank 7 and brings it towards the position $a$, and having the effect of sending the fluid under pressure into the spring device and causing the body to rise. In this direction, the pivoting movement of the crank 7 is braked by the dash-pot 11, so that the rising of the body of the vehicle takes place progressively.

In the new position occupied by the body of the vehicle, on the one hand, and the piston 15, on the other, the abutment 17 comprised by the piston rod 16, is sufficiently far from the crank 7 for the latter to be able to take up all the positions comprised between, $a$ and $b$, according to the impulses that this crank receives from the connecting-rod 5 provided with the spring 6, owing to uneven places in the road. The stroke of the pistons 15, and hence, the position $d$ can be variable for the various wheels of the vehicle, so that the displacements of the body result from the combination of crosswise and rotation movements to bring the steps, for example, to an optimum height when stopping, for facilitating access to the vehicle as much as possible.

According to the alternative shown in FIG. 3, two assemblies of the members of the same set of wheels are shown, one of the assemblies being designated with the same reference numerals as in FIG. 1, and the other also has these reference numerals, but given the index number 1.

According to this alternative, the set of wheels comprises only one cylinder 12a fed by the output conduit 19 of the electro-valve 20 controlled by the winding 23. The rod 16a of the piston 15a drives, through a connecting part 24, two flexible transmissions 25, 26, identical with each other, whose casings 27 and 28 bear on the levers 4 and $4_1$. In this case, working is identical with that described with reference to FIGS. 1 and 2, the drive of the cranks 7 and $7_1$ being simultaneously effected by the flexible transmission 25 and 26 when the body of the vehicle is required to be lowered.

FIGS. 4 and 5 show a particular form of embodiment of the cylinder unit 12 with connecting rod 5 and spring 6. The cylinder 12 is hinged by a lug 29 to the lever 4 and contains a piston 15 provided with a tight-fitting packing 30. The piston is normally held against a journal 31 by a spring 32 pressing against a bearing 33 maintained by a ring 34.

The bearing 33 acts as guide for a tube 35 whose end, projecting from the cylinder 12, is closed by a cap 36 comprising attaching means 37 for ensuring its connection to the crank 7. The cap 36 acts as an abutment for a tubular strut 38 against which a ring presses that acts as abutment for one of the ends of a spring 40, its other end exerting a thrust on a second ring 41 whose movement is limited both by a crown member 42 and a shoulder-piece 43 formed by the rod 16 of the piston. The springs 40 and 32 are so selected that the action of the spring 32 is always greater than that of the spring 40.

The position of the members shown at the top part of FIG. 4 corresponds to the position $c$ (FIG. 1) of the crank 7, i.e., the position in which the body of the vehicle is high, for example, when running.

The short duration impulses transmitted to the wheels are absorbed by the spring 40 owing to the braking exerted by the dash-pot 11. Actually, a short duration impulse in the direction of the arrow $f_3$ displaces the cylinder 12 whose piston 15 remains abutting against the journal 31, by causing the bearings 33 to slide on the tube 35. The spring 40 is also compressed, because the shoulder-piece 43 of the rod 16 of the piston moves the ring 41 in the direction of the arrow $f_3$ the end 37 being braked in its displacement by the dash-pot 11 of FIG. 1.

For a short duration impulse directed in a direction opposite to the arrow $f_3$, the spring 40 is compressed, the piston 15 being displaced by the action of the ring 34 of the bearing 33 and the spring 32 whose action is always greater than that of the spring 40; the rod 16 displaces the ring 39 by the action exerted on it by an annular piece 44 integral with the rod 16.

For longer duration impulses, the tube 35 is moved in one direction or the other, under the action of the spring 40 which tends to return to its original length and, hence, the crank 7 drives the distributor 8 for influencing the principal spring suspension device.

As already explained above, when the body of the vehicle is required to be lowered, the cylinder 12 is fed to lengthen the resilient connecting rod 5, 6 (FIG. 1). The fluid under pressure, sent into the conduit 18, thrusts the piston 15 almost instantaneously, and hence, the members described above in FIG. 4 assume the positions designated by their reference numerals with an index 1 (lower part of FIG. 4).

Owing to the braking action exerted by the dash-pot 11, the position of the cap 36, and hence, the crank 7, is not yet altered at the moment when the piston $15_1$ comes into contact with the strut-tube 45 bearing against the bearing 33 and forming an inside lining for the cylinder 12. It follows that the springs $40_1$ and $32_1$ are compressed, the ring $39_1$ being always in contact with the strut-tube $38_1$, whereas the ring $41_1$ thrust by the shoulder-piece $43_1$ of the rod $16_1$, is at a certain distance from the crown-member $42_1$. By relaxing, the spring $40_1$ thrusts the ring $39_1$ and hence, by means of the cap 36, the tube 35, so that the various members of the device are brought to the position shown at the top part of FIG. 5, for which the reference numerals designating the respective members having the index number 2 added to them.

The extension of the device taking place in a progressive manner owing to the braking exerted by the dash-pot 11, the action of the distributor 8 is not abrupt, and consequently, the lowering of the vehicle occurs without affecting its passengers' comfort.

As shown in the top part of FIG. 5, the extension that the device can assume is limited, because the stroke of the piston $15_2$ is regulated by the strut-tube 45 and that the lengthening of the spring $40_2$ is limited to the length separating the shoulder-piece $43_2$ from the rod $16_2$ of the annular piece $44_2$. This lengthening can, moreover, be easily regulated as it is only necessary to alter the effective length of the strut-tube $45_2$.

As can be seen from the drawing, the device unit works in this configuration exactly as in that shown in the top part of FIG. 4, the position $15_2$ being held rigidly motionless in relation to the cylinder $12_2$ by the pressure of the fluid.

To bring the body of the vehicle back to the normal high position, the electro-valve 20 is operated as previously indicated to put the cylinder 12 into communication with the tank or reservoir or the open air. The spring $32_3$ (lower part of FIG. 5) rapidly thrusts the piston $15_3$ which again comes into contact with the journal $31_3$, this movement has the effect of compressing the spring $40_3$ whose strength is always less than that of the spring $32_3$. Actually, the dash-pot 11 exerts a braking action and prevents the tube $35_3$ from being rapidly returned to its original position, so that the annular piece $44_3$ causes the ring $39_3$ to slide which compresses the spring $40_3$ bearing against the ring $41_3$ held motionless by the crown-member $42_3$. The spring $40_3$ then relaxes progressively causing the tube $35_3$ to slide, and consequently acting on the crank 7, progressively brought between the position $c$ and the position $a$, which causes the body of the vehicle to rise, this rise then having the effect of bringing the crank 7 into the position $c$, whereas the resilient device described above is again brought in the position shown at the top part of FIG. 4.

As can be seen from the foregoing, this particular embodiment of the resilient connecting rod and cylinder enables very sure working to be obtained, because the distributor 8 is operated with accuracy and gently, whereas the short duration impulses are absorbed in the resilient device itself, even without the piston 15 being displaced, which prevents the tight-fitting packing 30 from wearing out, as it only acts during the displacements of the piston 15 causing the lowering and raising of the body of the vehicle.

The fluid used for operating the piston 15 can be either a liquid fluid or a gaseous fluid, such as compressed air. When this device is mounted on a heavy vehicle, it is even advantageous to use compressed air, seeing that this vehicle generally comprises a compressed air plant for operating various parts of the mechanism.

In the foregoing, it has been presumed that the suspension of the vehicle was of the hydraulic type. This device can nevertheless be employed when the vehicle comprises another kind of suspension, and more particularly, a purely pneumatic suspension.

FIG. 6 shows diagrammatically, an embodiment of this kind, in which the distributor 8 is replaced by an air distributor 46 in which the compressed air is introduced through piping 47. This distributor can ensure communication, under certain conditions, between the piping 47 and the main suspension device by a pipe 48.

For another position of the distributor, the main suspension device is connected with the atmosphere by a pipe 49. The distributor is operated by a lever 50 in the same way as for the distributor 8. In the position of the lever 50, shown by solid lines in the drawing, the communication between the various pipes 47, 48, 49 is interrupted, which corresponds to a given position of the body 51 of the vehicle.

Presuming that the lever 50 pivots in the direction of the arrow $f_4$, to go towards the position $50_1$, the pipes 48 and 49 are put into communication and the compressed air contained in the main suspension device can escape, so that the body 51 of the vehicle descends in relation to the axle-holder 1.

In a displacement in opposite direction to the lever 50, displacement which may occur as far as the position designated by $50_2$, the pipes 47 and 48 are brought in communication and the body 51 is raised with respect to the axle-holder.

52 designates a connecting rod connected by a knuckle 53 to second connecting rod 54 whose end is connected by a suitable knuckle 55 to the end of the lever 50 and whose other end is connected, by another knuckle 56 to the rod of the piston 57 of a jack 58 similar to the jack 12 of the preceding figures.

In normal working, i.e., when the body 51 is in the high position, the impulses received by the axle-holder 1 are transmitted by the small connecting rod 52 to the connecting rod 54, which has the effect of moving the lever 50 in one or the other direction.

In the type of suspension, which uses air under pressure, the capacity of the main suspension members being great, it is not important that these members should be influenced even for short duration displacements, seeing that the quantity of air evacuated or additional air admitted is small, with respect to their capacity, which avoids making use of the dash-pot 11 and resilient connecting rod system 5, 6.

When the vehicle requires to be lowered, the compressed air contained in the jack is evacuated, which is obtained by the action of an electro-valve similar to the electro-valve 20 whose winding 23 is controlled by the driving member or members selected.

The displacement of the piston of the jack 58 has the effect of bringing the knuckle 56 towards the position $56a$; in this manner the lever 54 pivots around 53, and consequently, the lever 50 pivots to reach a point situated between the extreme positions 50 and $50_1$, so that the distributor 46 is operated in the direction whereby the body 51 is lowered, which corresponds to a relative rise of the axle-holder, which occupies the position diagrammatically shown by dotted lines.

As the lowering of the body 51 progresses, the knuckle 53 traverses the space comprised between the positions of 53 and $53a$. In this latter position, the lever has returned to the position shown by solid lines, which is the neutral position, and hence, the movement of the body is stopped.

To return the body 51 to the high position, the jack 58 is again fed and inverse operations are carried out.

The invention is not restricted to the examples of embodiment shown and described in detail, for various modifications can be applied to it without going outside of its scope. In particular, it can be operated for types of suspension differing from those dealt with above as examples. Actually, it is possible to devise suspensions with electric control or the like.

I claim:

1. In a road vehicle having wheels engaging ground and a body resiliently supported by said wheels, a fluid suspension device of a known type interposed between said wheels and said body, pivotally mounted connecting members for connection of each one of said wheels and of said body, the particular combination of an adjusting valve of known type in relation with each wheel for the regulation of the suspension device to maintain substantially constant the distance between said wheels and said body, a lever rigidly carried by each said pivotally mounted connecting member, an elastic connecting rod interposed between each one of said levers and said adjusting valves, a damping member associated in a known manner with each adjusting valve, a cylinder connected to each one of said levers, each said cylinder enclosing a piston provided with an actuating rod for actuation of said regulating valves when said cylinder is supplied with fluid.

2. A structure as set forth in claim 1, comprising further an electromagnetically operated valve for supplying said cylinder, said electromagnetically operated valve being controlled by a door of the vehicle when said door is opened so that the valves regulating the fluid suspension devices place the latter in a position for which the body of the vehicle is lowered.

References Cited in the file of this patent

UNITED STATES PATENTS

| | | |
|---|---|---|
| 1,664,510 | Hughes | Apr. 3, 1928 |
| 2,361,575 | Thompson | Oct. 31, 1944 |
| 2,644,699 | Weiertz | July 7, 1953 |
| 2,787,475 | Jackson | Apr. 2, 1957 |